US006329781B1

United States Patent
Matsui et al.

(10) Patent No.: US 6,329,781 B1
(45) Date of Patent: Dec. 11, 2001

(54) CONTROL APPARATUS OF SYNCHRONOUS MOTORS

(75) Inventors: Hirokazu Matsui; Hiroshi Katada, both of Hitachinaka; Takefumi Sawada, Ishioka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/499,625

(22) Filed: Feb. 8, 2000

(30) Foreign Application Priority Data

Feb. 8, 1999 (JP) .................................................. 11-029886

(51) Int. Cl.[7] ...................................................... H02P 1/46
(52) U.S. Cl. ........................... 318/717; 318/721; 318/139
(58) Field of Search ................................... 318/799–818, 318/439, 432, 717, 721, 778, 605, 139; 363/95, 96, 98

(56) References Cited

U.S. PATENT DOCUMENTS

| 4,823,251 | * | 4/1989 | Kawabata et al. | 363/95 |
| 5,038,092 | * | 8/1991 | Asano et al. | 318/806 |
| 5,504,404 | * | 4/1996 | Tamaki et al. | 318/432 |
| 5,569,995 | * | 10/1996 | Kusaka et al. | 318/717 |
| 5,717,305 | * | 2/1998 | Seibel et al. | 318/778 |
| 5,796,228 | * | 8/1998 | Kojima et al. | 318/605 |
| 5,877,607 | * | 3/1999 | Masaki et al. | 318/807 |
| 5,903,128 | * | 5/1999 | Sakakibara et al. | 318/721 |
| 5,920,161 | * | 7/1999 | Obara et al. | 318/139 |
| 5,936,378 | * | 8/1999 | Iijima et al. | 318/807 |
| 5,990,657 | * | 11/1999 | Masaki et al. | 318/811 |
| 6,025,691 | * | 2/2000 | Kawabata et al. | 318/700 |
| 6,069,467 | * | 5/2000 | Jansen | 318/802 |
| 6,137,258 | * | 10/2000 | Jansen | 318/802 |
| 6,163,130 | * | 12/2000 | Neko et al. | 318/806 |

FOREIGN PATENT DOCUMENTS

| 107772-7 | * | 4/1995 | (JP) . |
| 7-107772 |   | 4/1995 | (JP) . |
| 7-246000 |   | 9/1995 | (JP) . |
| 10-136699 |  | 5/1998 | (JP) . |

* cited by examiner

Primary Examiner—Paul Ip
(74) Attorney, Agent, or Firm—Crowell & Moring LLP

(57) ABSTRACT

An apparatus for executing field weakening control comprises a means for computing a start rotational speed of field weakening control based on a ratio of a battery voltage used in a normal operation to a detected battery voltage in execution of only field weakening control without generating a torque, and an interpolation means for carrying out linear interpolation on at least two values selectively fetched from a plurality of current tables in accordance with a battery voltage to find a field weakening current. The apparatus provided by the present invention is further characterized in that, in addition to correction of a start rotational speed of the field weakening control, a field weakening current is corrected in accordance with a ratio of a rated battery voltage used in a normal operation to a detected battery voltage.

8 Claims, 6 Drawing Sheets

CONTROL APPARATUS OF SYNCHRONOUS MOTORS

BACKGROUND OF THE INVENTION

The present invention relates to a synchronous electric motor control apparatus employed in a system for driving a synchronous electric motor by using a discharge output of a battery and used for controlling a synchronous electric motor in accordance with a torque command.

In a system for driving a synchronous electric motor by using a discharge output of a battery, it is quite within the bounds of possibility that the voltage of the electric motor exceeds the voltage of the battery at a high-speed region. In order to solve this problem, field weakening control to forcibly weaken the field magnetic flux of the electric motor is adopted in a variety of motor driving systems. To put it concretely, the field weakening control reduces the intensity of a field magnetic flux generated in a winding or a magnet by controlling a command of a d-axis current which is a part of an electric motor current contributing to generation of the field magnetic flux. Depending on factors such as the performance of the battery, a load condition and a residual electric charge, however, it is still quite within the bounds of possibility that the voltage of the electric motor exceeds the voltage of the battery, damaging the control apparatus even if the field weakening control is executed.

In order to solve the above problem, there has been introduced a technique of executing field weakening control after waiting for variations in battery voltage caused by a load of the electric motor to get stabilized as is disclosed in Japanese Patent Laid-open No. Hei 7-246000.

Japanese Patent Laid-open No. Hei 7-107772 discloses a technique of field weakening control which, for a rotational speed of an electric motor exceeding a base rotational speed, comprises the steps of computing a maximum voltage that can be output by the electric motor from the voltage of a battery; computing a weakening field current command Id* from the computed maximum voltage of the electric motor and executing the field weakening control based on the computed current Id*. Japanese Patent Laid-open No. Hei 10-136699 discloses a technique of correction and reduction of a torque command given to the electric motor so as to merely make an inferred value of the electric motor voltage below a value corresponding to a detected value of the battery voltage.

The conventional technology is effective for execution of field weakening control with the voltage of the electric motor never exceeding the voltage of the battery due to correction of a torque command. When it is desired to output a desired torque at a desired rotational speed, however, depending on the voltage of the battery, a sufficiently large torque may not be obtained for some cases. In addition, since the base rotational speed changes when the voltage of the battery changes, optimum field weakening control can not be executed in some cases due to the variable base rotational speed.

SUMMARY OF THE INVENTION

It is thus an object of the present invention to provide an electric motor control apparatus capable of executing field weakening control keeping up with variations in battery voltage and field weakening control capable of always outputting a desired torque at a desired rotational speed without a risk of for example damaging the apparatus due to the fact that the terminal voltage of the electric motor exceeds the voltage of the battery even if the voltage of the battery varies.

It is another object of the present invention to provide an electric motor control apparatus which is capable of implementing field weakening control in proper extent, allows the configuration to be simplified, and reduces a decrease in efficiency to a minimum.

It is a further object of the present invention to provide an electric motor control apparatus which is capable of implementing highly efficient field weakening control and sustaining a required torque in spite of a variation in battery voltage.

In order to achieve the objects described above, there is provided a control apparatus of a permanent-magnet synchronous electric motor driven by power supplied by a battery through an inverter circuit, the control apparatus comprising: a current-command generation means for outputting a d-axis current command, a torque current command or a so-called q-axis current command to the permanent-magnet synchronous electric motor; a current detection means for detecting a d-axis current and a q-axis current of the synchronous electric motor from phases and 3-phase alternating-current values of the synchronous-electric motor; a compensation computation means for computing a d-axis voltage compensation value and a q-axis voltage compensation value on the basis of the d-axis current command, the q-axis current command, a detected value of the d-axis current and a detected value of the q-axis current; a voltage-command generation means for generating a 3-phase alternating-current voltage command from the d-axis voltage compensation value, the q-axis voltage compensation value and phases, as well as the rotational speed of the synchronous electric motor; and a PWM (Pulse Width Modulation) control means for generating a PWM signal for driving a power device of the inverter circuit from a value of the 3-phase alternating-current voltage command.

The present invention is characterized in that, in execution of the field weakening control, a start rotational speed of the field weakening control is corrected in accordance with a detected value of the voltage of the battery so that, when the voltage of the battery is high, the start rotational speed is increased while, when the voltage of the battery is low, the start rotational speed is decreased.

In addition, the present invention is further characterized in that at least one of the d-axis current command and the q-axis current command is corrected in accordance with a ratio ($V_{B0}/V_{BB}$) of a rated battery voltage $V_{B0}$ in a normal operation to a detected battery voltage $V_B$.

Furthermore, the present invention is further characterized in that at least one of the d-axis current command and the q-axis current command is generated by interpolation based on either a table of d-axis current commands or a table of q-axis current commands respectively which includes at least two interpolation values for usable different values of the battery voltage corresponding to a detected value of the battery voltage.

According to the present invention, in execution of the field weakening control without generating a torque, the start rotational speed of the field weakening control is computed from a ratio of a battery voltage used in a normal operation to a detected battery voltage. By correcting the start rotational speed of the field weakening control in this way, it is possible to execute field weakening control which keeps up with a variation in battery voltage. As a result, it is possible to implement field weakening control, in proper extent, that never allows the terminal voltage of the electric motor to exceed the voltage of the battery.

Another characteristic of the present invention is that, in addition to the correction of the start rotational speed of the field weakening control described above, a current of a weakened field is corrected in accordance with a ratio of a battery voltage used in a normal operation to a detected battery voltage. As a result, it is possible to implement field weakening control, in proper extent, which allows the configuration to be made simple, allows a decrease in efficiency to be reduced to a minimum, and never allows the terminal voltage of the electric motor to exceed the voltage of the battery.

In addition, a current of a weakened field is selected from a plurality of current-command tables corresponding to voltages of the battery and by linear interpolation based on values read out from the tables. As a result, it is possible to execute highly efficient current control and to assure a required torque even if the voltage of the battery varies.

LIST OF REFERENCE NUMERALS

5—Battery-voltage detection unit
6—Speed detection unit
8—Torque-command processing unit
9—Current-command determination unit
90—Field weakening control unit
201—searching means for dq-axis-current-command table
202—Correction means for field-weakening-start-rotational speed
304—Id interpolation means
305—Battery-voltage determination means
503—Battery-voltage correction means

DESCRIPTION OF THE PREFERRED EMBODIMENTS

Figure 1:
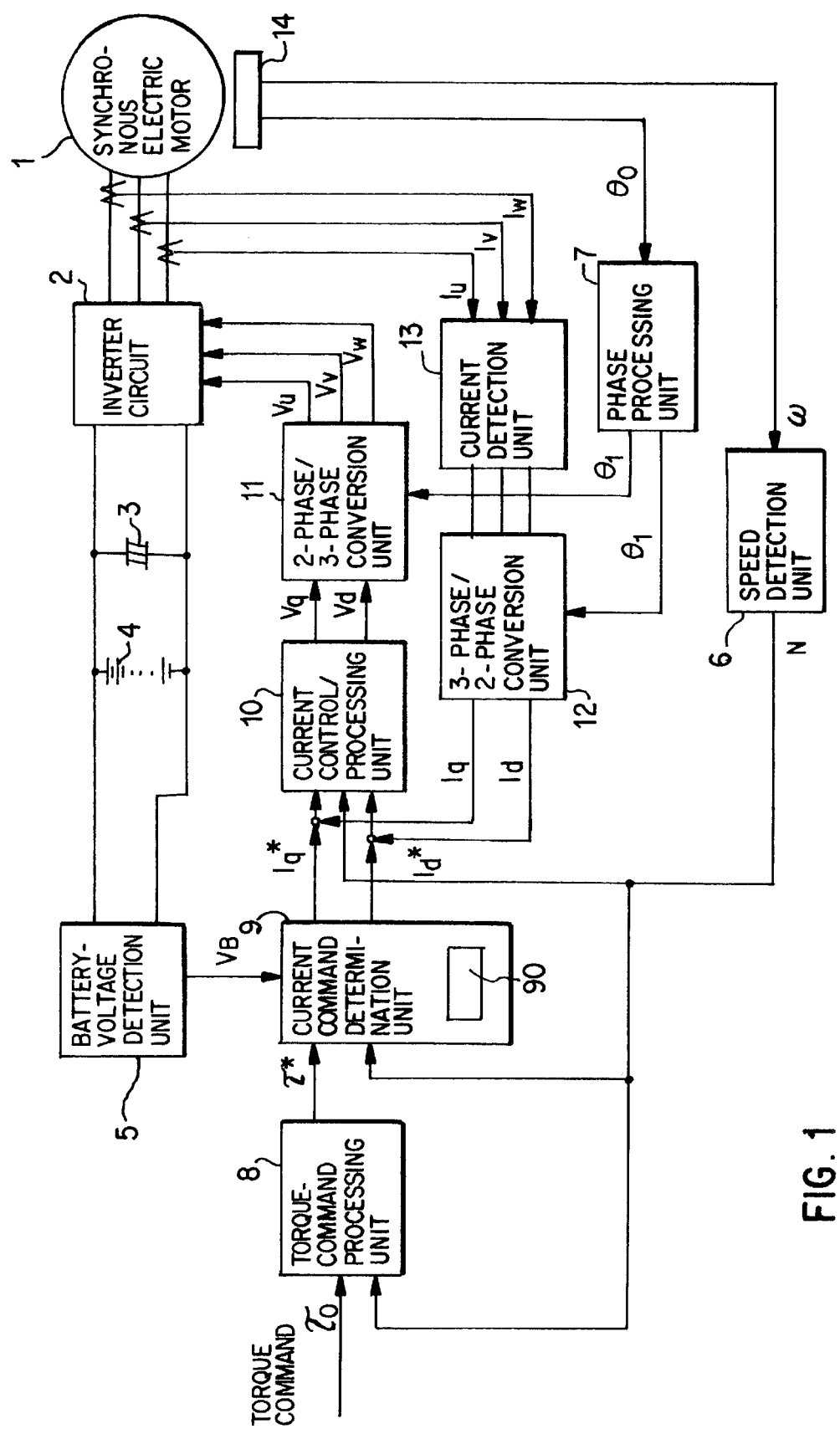
FIG. 1 is a diagram showing the configuration of a driving system of an electric car having an electric motor control apparatus implemented by an embodiment of the present invention.

Some preferred embodiments of the present invention are explained by referring to the diagrams as follows. FIG. 1 is a diagram showing the configuration of a driving system of an electric car having an electric motor control apparatus implemented by an embodiment of the present invention. The synchronous electric motor 1 shown in the figure is a permanent-magnet synchronous electric motor receiving power from a battery 4 serving as a power supply through an inverter circuit 2. The permanent-magnet synchronous electric motor 1 has a speed detection unit 6 for detecting a speed on the basis of an output of a resolver 14 functioning as a rotation sensor, and a phase processing unit 7 for computing a phase on the basis of an output of the resolver 14 functioning as a magnetic-pole-position sensor for detecting the position of a magnetic pole. The speed detection unit 6 supplies information on a rotational speed to a torque-command processing unit 8, a current-command determination unit 9 and a current control/processing unit 10. On the other hand, the phase processing unit 7 supplies information on a phase (a phase angle $\theta_1$) to a 2-phase/3-phase conversion unit 11 and a 3-phase/2-phase conversion unit 12. On a direct-current input side of the inverter circuit 2, a capacitor 3 and a battery-voltage detection unit 5 are provided. The capacitor 3 smoothens the voltage of the battery 4. On the other hand, the battery-voltage detection unit 5 is used for measuring the voltage of the battery 4 supplied to the inverter circuit 2. The battery-voltage detection unit 5 supplies a detected value $V_B$ of the battery voltage to the current-command determination unit 9 which includes a field weakening control unit 90. On an alternating-current output side of the inverter circuit 2, a current detection unit 13 is provided for detecting U, V and W phases of alternating currents Iu, Iv and Iw of the synchronous electric motor 1 respectively. The 3-phase currents Iu, Iv and Iw detected by the current detection unit 13 and the phase angle $\theta_1$ computed by the phase processing unit 7 are supplied to the 3-phase/2-phase conversion unit 12 to be subjected to dq-axis conversion to produce current detected values Id^ and Iq^ which are supplied to the current control/processing unit 10.

The field weakening control unit 90 employed in the current-command determination unit 9 computes a d-axis current command Id* and a q-axis current command Iq* based on a rotational speed N received from the speed detection unit 6, a battery voltage $V_B$ a detected by the battery-voltage detection unit 5 and a torque command $\tau^*$ obtained as a result of processing carried out by the torque-command processing unit 8, and outputs the d-axis current command Id* and the q-axis current command Iq* to the current control/processing unit 10. The current control/processing unit 10 executes PI control to compute a d-axis voltage command Vd and a q-axis voltage command Vq based on the d-axis current command Id* and the q-axis current command Iq* received from the current-command determination unit 9, the d-axis current command Id^ and the q-axis current command Iq^ received from the 3-phase/2-phase conversion unit 12 as a result of the dq-axis conversion and the rotational speed N output by the speed detection unit 6, outputting the d-axis voltage command Vd and the q-axis voltage command Vq to the 2-phase/3-phase conversion unit 11. The 2-phase/3-phase conversion unit 11 computes 3-phase alternating-current commands Vu, Vv and Vw based on the d-axis voltage command Vd and the q-axis voltage command Vq received from the 3-phase/2-phase conversion unit 12 and the phase angle $\theta_1$ computed by the phase processing unit 7. The 3-phase alternating-current commands Vu, Vv and Vw are converted by a PWM-signal control unit employed in the 2-phase/3-phase conversion unit 11 into switching signals of all phases in the inverter circuit 2, supplying the switching signals to the inverter circuit 2.

Figure 2:
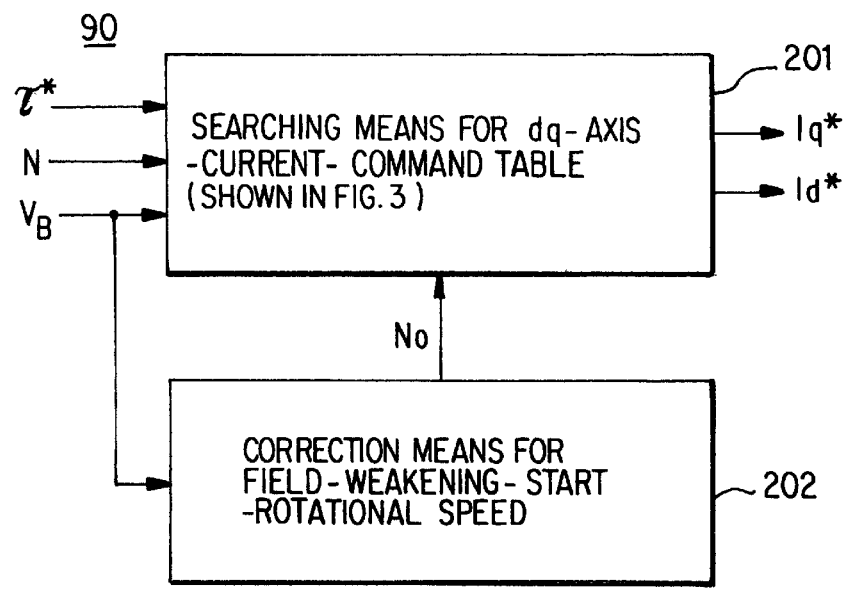
FIG. 2 is a diagram showing a field weakening control unit employed in a current-command determination unit shown in FIG. 1.

As shown in a block diagram of FIG. 2, the field weakening control unit 90 employed in the current-command determination unit 9 comprises a searching means for a dq-axis-current-command table 201 and a correction means for a field-weakening-start-rotational speed 202. The correction means for a field-weakening-start-rotational speed 202 computes a field-weakening-control start rotational speed $N_0$ by using Eq. (1) as follows:

$$N_0 = N_B * K * V_B / V_{B0} \quad (1)$$

where the symbol $N_B$ denotes an optimum field-weakening-control start rotational speed at a battery voltage used in a normal operation, the symbol $V_B$ denotes a voltage of the battery 4 detected by the battery-voltage detection unit 5, the symbol $V_{B0}$ denotes the voltage of the battery 4 used in the normal operation and the symbol K denotes a constant.

Figure 3:
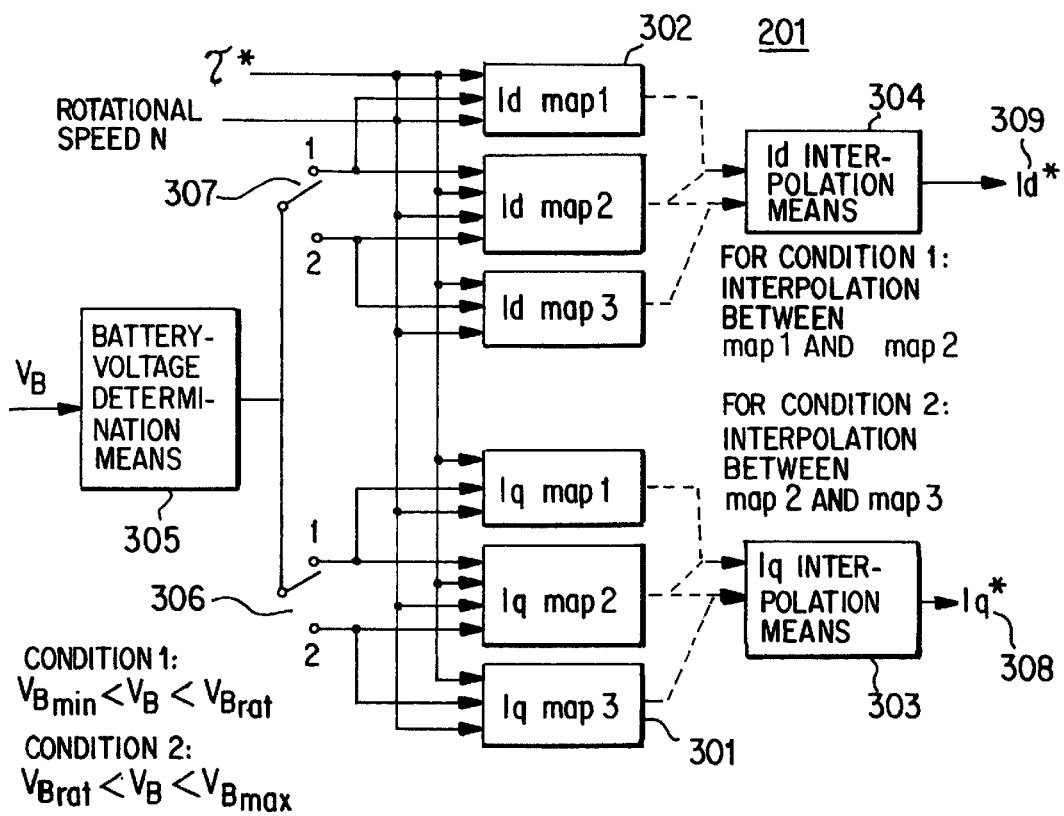
FIG. 3 is a diagram showing an internal configuration of a searching means for a dq-axis-current-command table shown in FIG. 2.

Next, an embodiment implementing the searching means for a dq-axis-current-command table 201 employed in the field weakening control unit 90 shown in FIG. 1 is explained by referring to FIG. 3. This embodiment includes tables A.

The current-command determination means 9 has n tables A on the d-axis side and n tables A on the q-axis side. Each of the tables includes high-efficiency data which is determined by a battery voltage $V_{BK}$ and includes a minimum value and a maximum value in the voltage usage range of the battery 4 in advance. The tables A on the q-axis side are Iq tables 301 and the tables A on the d-axis side are Id tables 302. To put it concretely, the Iq tables 301 are Iq map 1 to Iq map 3 and the Id tables 302 are Id map 1 to Id map 3. An Iq interpolation means 303 is connected to the output of the Iq tables 301 and an Id interpolation means 304 is connected to the output of the Id tables 302. The tables 301 and the tables 302 each receive a torque command τ* output by the torque-command processing unit 8, a rotational speed N detected by the speed detection unit 6 and a battery voltage $V_B$ supplied by a battery-voltage determination means 305 by way of switches 306 and 307 respectively.

For $V_{Bmin} < V_B < V_{Brat}$, the battery-voltage determination means 305 supplies the battery voltage $V_B$ to Iq map 1 and Iq map 2 to determine values for interpolation by way of the switch 306 and to Id map 1 and Id map 2 to determine values for interpolation by way of the switch 307 where the symbol $V_{Bmin}$ is the minimum value cited above and the symbol $V_{Brat}$ denotes the rated battery voltage.

For $V_{Brat} < V_B < V_{Bmax}$, on the other hand, the battery-voltage determination means 305 supplies the battery voltage $V_B$ to Iq map 2 and Iq map 3 to determine values for interpolation by way of the switch 306 and to Id map 2 and Id map 3 to determine values for interpolation by way of the switch 307 where the symbol $V_{Bmax}$ is the maximum value cited above.

For $V_{Bmin} < V_B < V_{Brat}$ where $V_B$ is a voltage of the battery 4 detected by the battery-voltage detection unit 5, for example, the switches 306 and 307 are each positioned at a contact point "1". In this case, the battery-voltage determination means 305 supplies the battery voltage $V_B$ to Iq map 1 and Iq map 2 by way of the switch 306 to determine values for interpolation from Iq map 1 and Iq map 2 in accordance with the torque command τ* output by the torque-command processing unit 8, the rational speed N output by the speed detection unit 6 and the battery voltage $V_B$. The values are then supplied to an Iq interpolation means 303 to determine the q-axis current command Iq* by linear interpolation based on the following ratio:

$$(V_b - V_{B1}):(V_{B2} - V_B).$$

By the same token, the battery-voltage determination means 305 supplies the battery voltage $V_B$ to Id map 1 and Id map 2 by way of the switch 307 to determine values for interpolation from Id map 1 and Id map 2 in accordance with the torque command τ* output by the torque-command processing unit 8, the rational speed N output by the speed detection unit 6 and the battery voltage $V_B$. The values are then supplied to an Id interpolation means 304 to determine the d-axis current command Id* by linear interpolation based on the above ratio.

Figure 4:
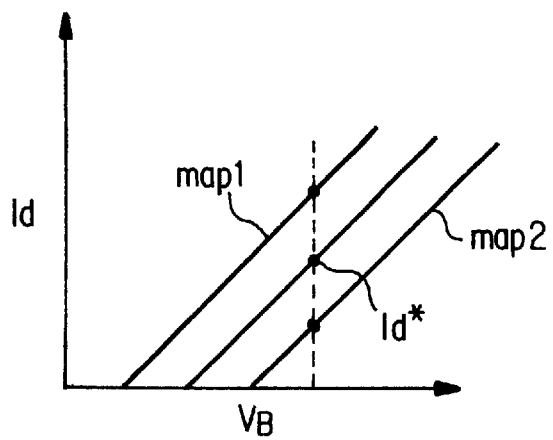
FIG. 4 is an explanatory diagram showing the principle of linear interpolation of an interpolation means shown in FIG. 3.

FIG. 4 is an explanatory diagram showing the principle of linear interpolation carried out by the Id interpolation means 304 whereby the d-axis current command Id* is found from values determined from Id map 1 and Id map 2.

Figure 5:
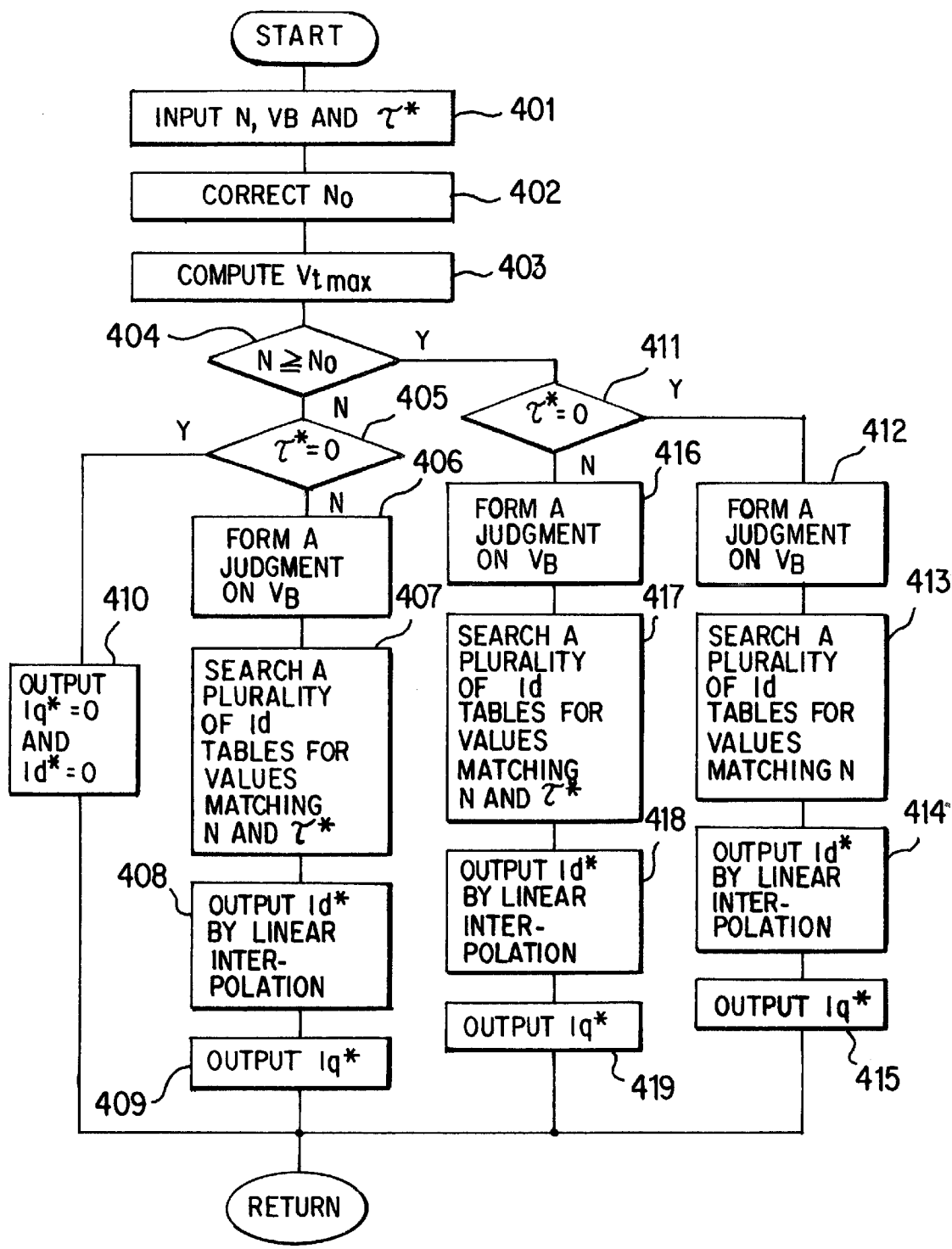
FIG. 5 is a diagram showing an operation flow of a first embodiment of the present invention.

The overall operation of the electric motor control apparatus shown in FIG. 1 is explained by referring to a flowchart of FIG. 5 which focuses on generation on the d-axis current command Id*. As shown in the figure, the flowchart begins with a step 401 at which the rotational speed N of the electric motor, the battery voltage $V_B$ and the torque command τ* are input. Subsequently, at a step 402, the field weakening start rotational speed $N_0$ is corrected on the basis of the rotational speed N of the electric motor and the battery voltage $V_B$.

Then, at a step 403, a maximum terminal voltage $V_{tmax}$ is computed from the battery voltage $V_B$ by using the following equation:

$$V_{tmax} = (\sqrt{3}/2\sqrt{2}) * 1.15 * V_B$$

Subsequently, at a step 404, the rotational speed N of the electric motor is compared with the field weakening start rotational speed $N_0$. If the rotational speed N of the electric motor is found smaller than the field weakening start rotational speed $N_0$, the flow of the operation goes on to a step 405 to form a judgment as to whether or not the torque command is 0. If the torque command is 0, the d-axis current command Id* and the q-axis current command Iq* are both set at 0. If the torque command is not 0, on the other hand, the flow of the operation goes on to a step 406 to form a judgment on the battery voltage $V_B$. Then, at a step 407, a plurality of Id tables are searched for a plurality of Id-axis current commands Id* matching the rotational speed N of the electric motor and the torque command τ*. Subsequently, at a step 408, a final Id-axis current command Id* is found by linear interpolation of the Id-axis current commands Id* found at the step 407. Then, at a step 409, a final Iq-axis current command Iq* is found by linear interpolation of Iq-axis current commands Iq* found by searching a plurality of Iq-axis tables in the same way as the final Id-axis current command Id*.

If the rotational speed N of the electric motor is found at least equal to the field weakening start rotational speed $N_0$ at the step 404, on the other hand, the flow of the operation goes on to a step 411 to form a judgment as to whether or not the torque command is 0. If the torque command is 0, the flow of the operation goes on to a step 412 to form a judgment on the battery voltage $V_B$. Then, at a step 413, a plurality of Id tables are searched for a plurality of Id-axis current commands Id* matching the rotational speed N of the electric motor. Subsequently, at a step 414, a final Id-axis current command Id* is found by linear interpolation of the Id-axis current commands Id* found at the step 413. Then, at a step 415, a final Iq-axis current command Iq* is found by linear interpolation of Iq-axis current commands Iq* found by searching a plurality of Iq-axis tables in the same way as the final Id-axis current command Id*.

If the torque command is not 0, on the other hand, the flow of the operation goes on to a step 416. Pieces of processing carried out at steps 416 to 419 to output the Id-axis current command Id* and the Iq-axis current command Iq* are the same as the pieces of processing carried out at the steps 406 to 409 as described earlier.

Figure 6A:
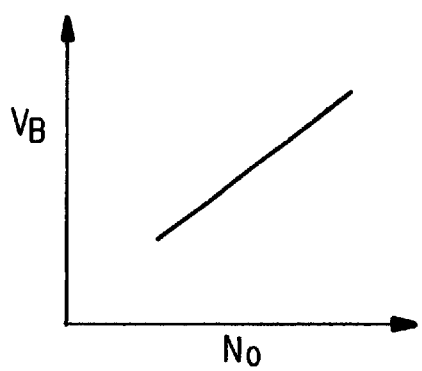
FIG. 6 is an explanatory diagram showing operating characteristics of the first embodiment.
Figure 6B:
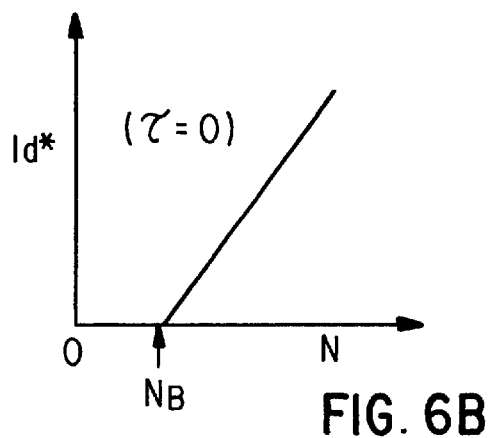
Figure 6C:
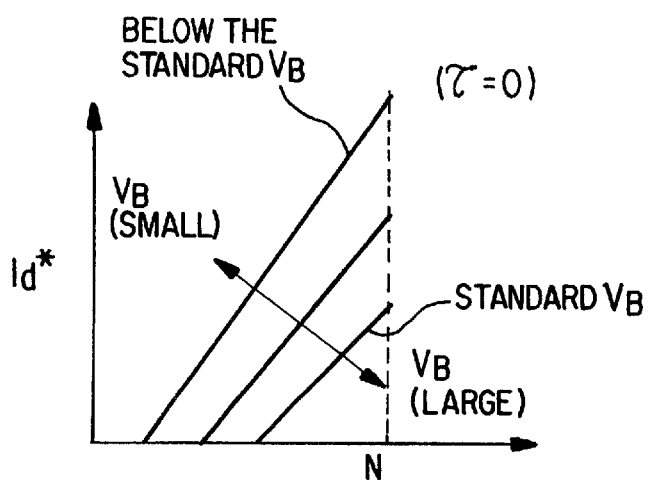

As shown in FIG. 6A, the field weakening start rotational speed $N_0$ output by the correction means for a field-weakening-start-rotational speed 202 changes in dependence on the battery voltage $V_B$ detected by the battery-voltage detection unit 5. On the other hand, the Id-axis current command Id* output by the searching means for a dq-axis-current-command table 201 changes in dependence on the field weakening start rotational speed $N_0$ as shown in FIG. 6B. As a result, the relation between the Id-axis current command Id* and the rotational speed N varies in accordance with the battery voltage $V_B$ as shown in FIG. 6C. It is thus possible to execute field weakening control suitable for the battery voltage $V_B$. The relations shown in FIG. 6 hold true of the q-axis current command Iq*.

As described above, in this embodiment, the field weakening start rotational speed is controlled in accordance with the battery voltage. In addition, values of the Id-axis current command Id* are read out from map 1 and map 2 of the Id-table and subjected to linear interpolation according to the battery voltage $V_B$ to find an eventual Id-axis current command Id*. By the same token, values of the Iq-axis current command Iq* are read out from map 1 and map 2 of the Iq-table and subjected to linear interpolation according to the battery voltage $V_B$ to find an eventual Iq-axis current command Iq*. As a result, an optimum field weakening current can be obtained.

Figure 7:
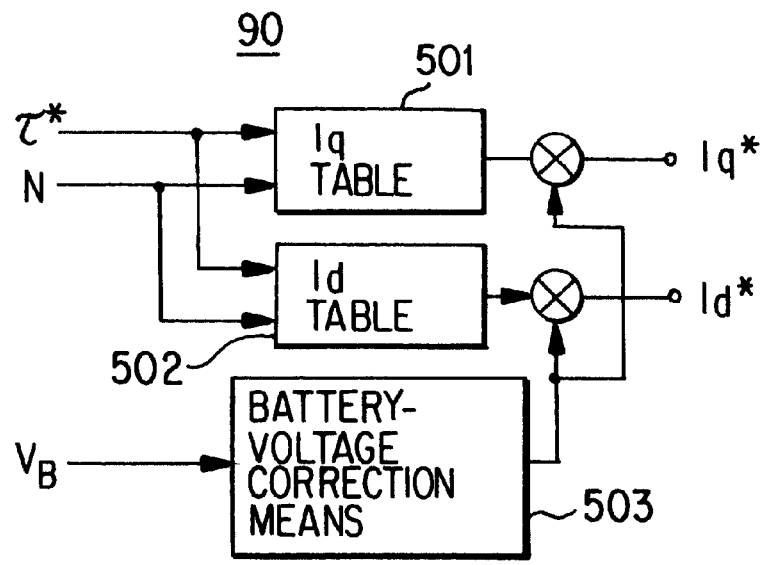
FIG. 7 is a diagram showing an internal configuration of a searching means for a dq-axis-current-command table of a second embodiment of the present invention.
Figure 8:
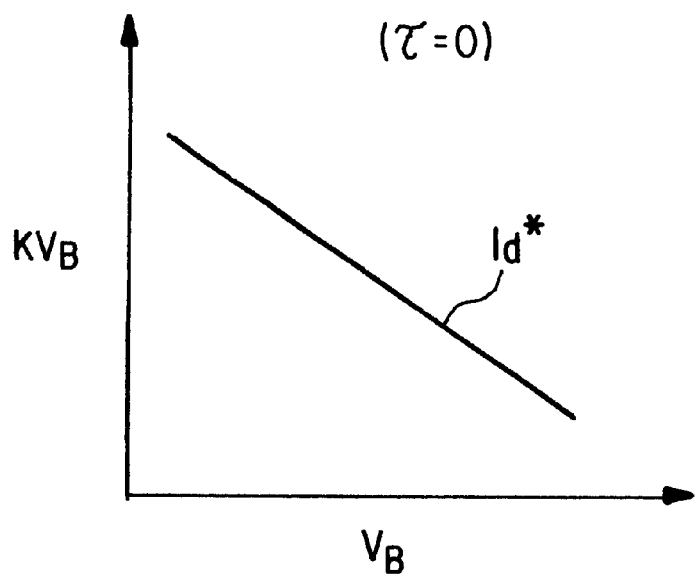
FIG. 8 is an explanatory diagram showing operating characteristics of the second embodiment.

Next, another embodiment implementing the field weakening control unit 90 employed in the current-command determination unit 9 provided by the present invention is explained by referring to FIGS. 7 and 8. In this embodiment, an Iq table 501 and an Id table 502 are searched for an Iq-axis current command Iq* and an Id-axis current command Id* respectively which match a torque command τ* output by the torque-command processing unit 8 and a rotational speed N detected by the speed detection unit 6. The Iq table 501 and the Id table 502 each include high-efficiency data determined in advance by a battery voltage used in a normal operation. After the Iq table 501 and the Id table 502 are searched for an Iq-axis current command Iq* and an Id-axis current command Id* respectively, a battery-voltage correction coefficient $KV_B$ is found by a battery-voltage correction means 503 in accordance with an equation given below. The battery-voltage correction coefficient $KV_B$ a which is used to find a field weakening current according to the voltage of the battery 4 is a voltage ratio.

$$KVB = V_{B0}/V_B$$

where the symbol $V_B$ denotes a battery voltage detected by the battery-voltage detection unit 5 and the symbol $V_{B0}$ denotes a rated battery voltage used in a normal operation. The Id-axis current command Id* is given by the following equation:

$$Id^* = KV_B \times Id1$$

where the symbol Id1 denotes a current value read out from the Id table 502.

In this embodiment, as shown in FIG. 8, control is executed so that, the larger the battery-voltage correction coefficient $KV_B$ and the smaller the detected battery voltage $V_B$ in comparison with the rated battery voltage $V_{B0}$, the larger the Id-axis current command Id*. In this way, the field weakening start rotational speed is controlled in accordance with the battery voltage, making it possible to obtain a field weakening current which minimizes a decrease in efficiency.

Figure 9:
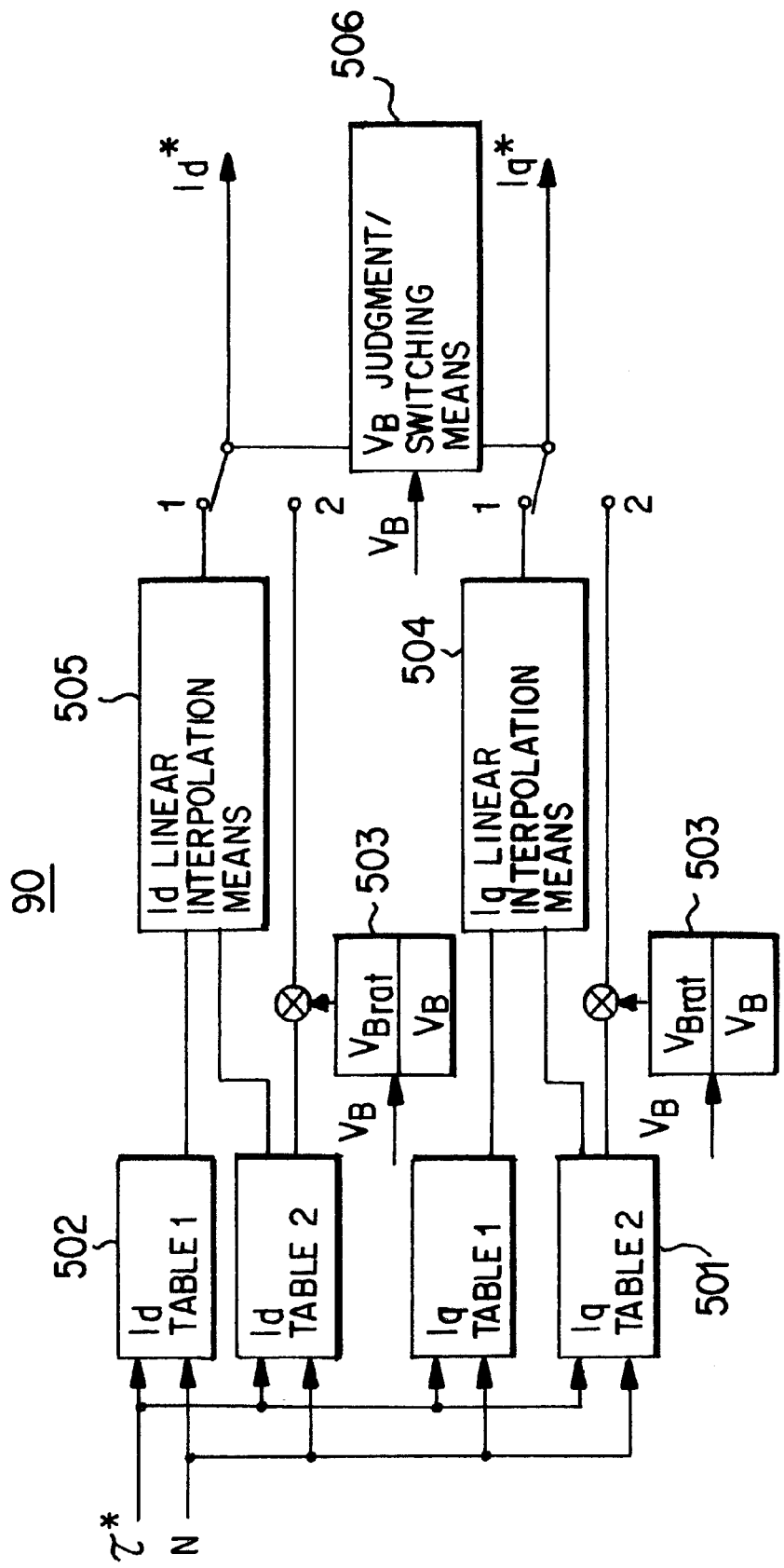
FIG. 9 is a diagram showing an internal configuration of a searching means for a dq-axis-current-command table of a third embodiment of the present invention.

Next, a further embodiment implementing the field weakening control unit 90 employed in the current-command determination unit 9 provided by the present invention is explained by referring to FIG. 9. This embodiment is obtained by adding an Id linear interpolation means 504 like the one explained before by referring to FIG. 4, a similar Iq linear interpolation means 505 and a $V_B$ judgment/switching means 506 to the embodiment explained earlier by referring to FIGS. 7 and 8. In the embodiment shown in FIG. 9, the $V_B$ judgment/switching means 506 forms a judgment on the battery voltage $V_B$ so that, for $V_{Bmin} < V_B < V_{Brat}$, switches are each positioned at contact point "1" while, for $V_{Brat} < V_B < V_{Bmax}$, the switches are each positioned at contact point "2" where the symbol $V_{Bmin}$ denotes a minimum assured voltage, the symbol $V_{Brat}$ denotes a rated voltage and the symbol $V_{Bmax}$ denotes a maximum assured voltage. When the switches are each positioned at contact point "1", both the Id-axis current command Id* and the Iq-axis current command Iq* are found by linear interpolation. When the switches are each positioned at contact point "2", on the other hand, the Id-axis current command Id* and the Iq-axis current command Iq* are found by multiplication of values read out from the tables 502 and 501 respectively by the battery-voltage ratio $V_{Brat}/V_B$.

According to the present invention, in execution of field weakening control, a start rotational speed of the field weakening control is corrected in accordance with a detected value of the battery voltage so that the terminal voltage of the electric motor does not exceed the detected value of the battery voltage even if the voltage of the battery varies. In addition, an Id-axis current command and an Iq-axis current command are each computed from at least two different detected values of the battery voltage between usable voltages of the battery.

In the embodiments described above, the Id-axis current command and the Iq-axis current command are both corrected. It should be noted, however, that it is also possible to correct only either the Id-axis current command or the Iq-axis current command.

In addition, the embodiments described above are applied to an electric car. It is needless to say, however, that the present invention can also be applied to another system.

According to the present invention, in execution of only field weakening control without generating a torque, by controlling the start rotational speed of the field weakening control in accordance with the voltage of the battery, it is possible to implement field weakening control, in proper extent, which never allows the terminal voltage of the electric motor to exceed the voltage of the battery.

In addition, the function of a means described above to generate a d-axis current command includes selection of a table in accordance with the voltage of the battery, making it possible to obtain a high-efficiency current command in spite of a variation in battery voltage and to assure a required torque.

Furthermore, by controlling the d-axis current command in accordance with a ratio of the rated battery voltage used in a normal operation to the varying battery voltage, the configuration can be made simple and a decrease in efficiency can be reduced to a minimum. Moreover, it is possible to implement field weakening control, in proper extent, which never allows the terminal voltage of the electric motor to exceed the voltage of the battery.

What is claimed is:

1. A control apparatus of a permanent-magnet synchronous electric motor driven by power supplied by a battery through an inverter circuit, said control apparatus comprising:

a current-command generation means for outputting a d-axis current command and a q-axis current command to said permanent-magnet synchronous electric motor;

a current detection means for detecting a d-axis current and a q-axis current of said synchronous electric motor from phases and 3-phase alternating-current values of said synchronous-electric motor;

a compensation computation means for computing a d-axis voltage compensation value and a q-axis voltage compensation value on the basis of said d-axis current command, said q-axis current command, a detected value of said d-axis current and a detected value of said q-axis current;

a voltage-command generation means for generating a 3-phase alternating-current voltage command from said d-axis voltage compensation value, said q-axis voltage compensation value and phases as well as a rotational speed of said synchronous electric motor; and a PWM (Pulse Width Modulation) control means for generating a PWM signal for driving a power device of said inverter circuit from a value of said 3-phase alternating-current voltage command, wherein, in performing field weakening control of said motor, a start rotational speed for execution of said field weakening control is corrected in accordance with a detected value of a voltage of said battery so that, when said voltage of said battery is high, said start rotational speed is increased while, when said voltage of said battery is low, said start rotational speed is decreased.

2. A control apparatus of a permanent-magnet synchronous electric motor according to claim 1, wherein, at least one of said d-axis current command and said q-axis current command is corrected in accordance with a ratio ($V_{BO}/V_{BB}$) of a rated battery voltage $V_{BO}$ used in a normal operation to a battery voltage $V_{BB}$ detected by said battery-voltage detection means.

3. A control apparatus of a permanent-magnet synchronous electric motor according to claim 1, wherein, at least one of said d-axis current command and said q-axis current command is generated by interpolation based on either a table of d-axis current commands or a table of q-axis current commands respectively which each includes at least two interpolation values for usable different values of said battery voltage corresponding to a detected value of said battery voltage.

4. A control apparatus of a permanent-magnet synchronous electric motor according to claim 1, wherein, at least one of said d-axis current command and said q-axis current command is generated by interpolation based on either a table of d-axis current commands or a table of q-axis current commands respectively which each includes at least two interpolation values for usable different values of said battery voltage corresponding to a detected value of said battery voltage, and at least one of said d-axis current command and said q-axis current command is corrected in accordance with a ratio of a rated battery voltage used in a normal operation to a battery voltage detected by said battery-voltage detection means.

5. A control apparatus of a permanent-magnet synchronous electric motor driven by power supplied by a battery through an inverter circuit, said control apparatus comprising:

a current-command generation means for outputting a d-axis current command and a q-axis current command to said permanent-magnet synchronous electric motor;

a current detection means for detecting a d-axis current and a q-axis current of said synchronous electric motor from phases and 3-phase alternating-current values of said synchronous-electric motor;

a compensation computation means for computing a d-axis voltage compensation value and a q-axis voltage compensation value on the basis of said d-axis current command, said q-axis current command, a detected value of said d-axis current and a detected value of said q-axis current;

a voltage-command generation means for generating a 3-phase alternating-current voltage command from said d-axis voltage compensation value, said q-axis voltage compensation value and phases as well as a rotational speed of said synchronous electric motor;

a PWM (Pulse Width Modulation) control means for generating a PWM signal for driving a power device of said inverter circuit from a value of said 3-phase alternating-current voltage command; and field weakening control means for implementing field weakening control of said permanent-magnet synchronous electric motor, commencing at a start rotational speed;

wherein, said start rotational speed of said field weakening control is adjusted by said field weakening control means in accordance with a detected value of a voltage of said battery so that, when said voltage of said battery is high, said start rotational speed is increased while, when said voltage of said battery is low, said start rotational speed is decreased.

6. A method of controlling a permanent-magnet synchronous electric motor driven by power supplied by a battery through an inverter circuit, said method comprising:

detecting at least one of battery voltage, rotational speed and a torque command input;

performing field weakening control of said motor to prevent voltage of said motor from exceeding said battery voltage at rotational speeds which exceed a field weakening start rotational speed of said motor; and adjusting said field weakening control start rotational speed as a function of a voltage output of said battery.

7. The method according to claim 6, wherein said adjusting step comprises increasing or decreasing said weakening control starting speed in response to an increase or decrease, respectively, of said battery.

8. The method according to claim 6, wherein said adjusting step comprises adjusting said weakening control starting speed in proportion to said battery voltage.

* * * * *